United States Patent
Flood et al.

(10) Patent No.: US 8,733,465 B1
(45) Date of Patent: May 27, 2014

(54) FIRE SUPPRESSION SYSTEM FOR LITHIUM ION BATTERIES

(71) Applicants: Gerald Grattan Flood, Birmingham, MI (US); Ronald Michael Butler, Farmington Hills, MI (US)

(72) Inventors: Gerald Grattan Flood, Birmingham, MI (US); Ronald Michael Butler, Farmington Hills, MI (US)

(73) Assignee: LITHFIRE-X, LLC, Detroit, MI (US)

( * ) Notice: Subject to any disclaimer, the term of this patent is extended or adjusted under 35 U.S.C. 154(b) by 0 days.

(21) Appl. No.: 13/900,049

(22) Filed: May 22, 2013

(51) Int. Cl.
| | |
|---|---|
| *A62C 3/07* | (2006.01) |
| *A62C 3/00* | (2006.01) |
| *A62C 37/14* | (2006.01) |
| *A62C 35/02* | (2006.01) |
| *H01M 2/10* | (2006.01) |
| *A62C 99/00* | (2010.01) |
| *H01M 10/0525* | (2010.01) |

(52) U.S. Cl.
CPC ... *A62C 3/07* (2013.01); *A62C 3/00* (2013.01); *A62C 37/14* (2013.01); *A62C 35/02* (2013.01); *A62C 99/009* (2013.01); *Y02E 60/122* (2013.01); *H01M 2/105* (2013.01); *H01M 2/1077* (2013.01); *H01M 10/0525* (2013.01); *Y02E 60/12* (2013.01)
USPC .......... 169/62; 169/26; 169/56; 169/57; 169/58; 169/70; 429/53; 429/61; 429/72; 429/99; 429/120; 429/163

(58) Field of Classification Search
CPC ........ A62C 3/0292; A62C 3/00; A62C 37/14; A62C 37/10; A62C 3/07; A62C 35/02; A62C 99/009; Y02E 60/12; Y02E 60/122; H01M 2200/10; H01M 2/105; H01M 2/1077; H01M 10/0525

USPC .......... 169/26, 54, 56–58, 60, 62, 66, 70; 429/53, 61, 62, 72, 99, 120, 122, 149, 429/163
See application file for complete search history.

(56) References Cited

U.S. PATENT DOCUMENTS

| | | | |
|---|---|---|---|
| 6,106,972 A | 8/2000 | Kokubo et al. | |
| 6,225,785 B1 * | 5/2001 | Au et al. | 429/53 |

(Continued)

FOREIGN PATENT DOCUMENTS

| | | | |
|---|---|---|---|
| DE | 102009038065 | * | 2/2011 |
| JP | 05151971 | | 6/1993 |

OTHER PUBLICATIONS

Firefreeze Worldwide, Inc., Cold Fire, Datasheet, Dec. 10, 1999, 6 Pages.

(Continued)

*Primary Examiner* — Steven J Ganey
(74) *Attorney, Agent, or Firm* — Wayne State University Law School Patent Procurement Law Clinic; Thomas D. Helmholdt

(57) ABSTRACT

A device for suppressing fires generated by lithium-ion batteries exhibiting thermal runaway. The device can include a thermally insulating enclosure for housing one or more battery cells. A fluid delivery system having a heat/temperature sensitive tube passes through each enclosure and contains an agent capable of extinguishing fires. When the cell or battery starts to undergo thermal runaway, the increase in temperature or the eruption of open flame causes the fluid delivery system to rupture inside the enclosure. The agent leaks out of the rupture and is transported into the enclosure and onto the malfunctioning cell or battery. Any fire is suppressed and the cell or battery is cooled down by the agent.

20 Claims, 3 Drawing Sheets

(56) References Cited

U.S. PATENT DOCUMENTS

| | | |
|---|---|---|
| 8,273,474 B2 | 9/2012 | Al-Hallaj et al. |
| 8,309,240 B1 | 11/2012 | Li et al. |
| 2004/0214074 A1* | 10/2004 | Gaignerot et al. ............. 429/61 |
| 2009/0014188 A1 | 1/2009 | Hesch et al. |
| 2010/0078182 A1 | 4/2010 | Alkemade et al. |
| 2012/0048577 A1 | 3/2012 | Ball |
| 2012/0070703 A1* | 3/2012 | Wahl et al. ..................... 429/53 |
| 2012/0231304 A1* | 9/2012 | Kaiser et al. .................... 429/72 |
| 2012/0312562 A1 | 12/2012 | Woehrle et al. |

OTHER PUBLICATIONS

TLI Group, Ltd., Material Safety Data Sheet for FEM-12SC, Datasheet, Feb. 2, 2007, 3 Pages.

GSL, Inc., Material Safety Data Sheet—Firebane 1170, Datasheet, Sep. 2011, 4 Pages.

\* cited by examiner

FIRE SUPPRESSION SYSTEM FOR LITHIUM ION BATTERIES

FIELD OF THE INVENTION

The invention relates to a fire extinguishing system with a method to prevent or extinguish fires, and more particularly, a fire suppression system having frangible extinguishant holders and automatic receptacles.

BACKGROUND

Several systems have attempted to deal with the issue of electrical fires and lithium-ion battery fires in particular. U.S. Pub. Appl. No. 2009/0014188 describes a device for containing ignited electrical equipment. The device includes a main body having an opening and volume sufficient to contain the electrical device and a flap to cover the opening to the main body when the electrical device is contained within the main body. By covering the opening with the flap, the lithium ion battery fire is contained within the device and not allowed to spread. However such a system does not deal with a thermal runaway reaction or a resulting fire, the system merely isolates these dangerous conditions from other cells in the battery.

U.S. Pat. No. 8,273,474 is a battery thermal management system where electrochemical cell battery systems and associated methods of operation are provided based on the incorporation of a thermal management matrix including a supply of phase change material disposed at least in part to a heat conductive lattice member to effectively dissipate heat produced or generated by or in the battery system. However such a system is only meant to cool a battery cell and if fire still occurs there is no method to suppress it.

U.S. Pub. Appl. No. 2010/0078182 is a device for generating and storing electrical or mechanical energy, and method for fire avoidance where an encapsulation in which at least one element of the device serving to generate or store electrical or mechanical energy is positioned, and having a container for flame-retardant substance. The substance store in the container releases a flame-retardant component if need be. However this system does not isolate each cell from another to prevent damage to other cells. Furthermore, this system has no method for activating in the presence of open flame.

SUMMARY

A fire suppression system furnishes a device to suppress fires generated by lithium-ion batteries. The device can include one or more battery cells, where each cell can be encased in a protective enclosure. Each enclosure can have an opening on one end. The enclosures define an empty volume or free space after a cell is inserted. A fluid delivery system can carry a fire-retarding or heat-dissipating fluid agent for delivery of the agent to the empty volume or free space of any given enclosure.

The device can include one or more battery cells, where each battery cell can be encased in a protective enclosure. Each enclosure can have an opening on one end, and the opening can be fitted with a cap to close the enclosure. Each cap can be disengaged from the opening of the enclosure. Each cap can include a pressure relief system in order to decrease pressure inside the corresponding enclosure. One or more temperature and flame sensitive tubes carrying a fire-retarding or heat-dissipating fluid agent can pass through each enclosure. When the temperature increases or a fire starts inside a given enclosure, the part of the tube inside the enclosure ruptures and the fluid agent can be delivered to the empty volume or free space of the given enclosure.

The device can include multiple battery cells, where each cell can be encased in a separate independent protective enclosure. Each enclosure can have an opening at one end with a cap fitted to engage and to sealingly close the enclosure. Each cap can be disengaged from a corresponding enclosure for battery cell maintenance. One or more temperature sensitive tubes carrying a fire-retarding or heat-dissipating fluid agent can pass through each enclosure in a serpentine or straight line fashion. When the temperature increases inside one or more enclosures due to an enclosed battery cell exhibiting a thermal runaway, a portion of the tube inside the affected enclosure can rupture and the fluid agent can be delivered to the empty volume or free space defined between the battery cell and a wall of the corresponding enclosure.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
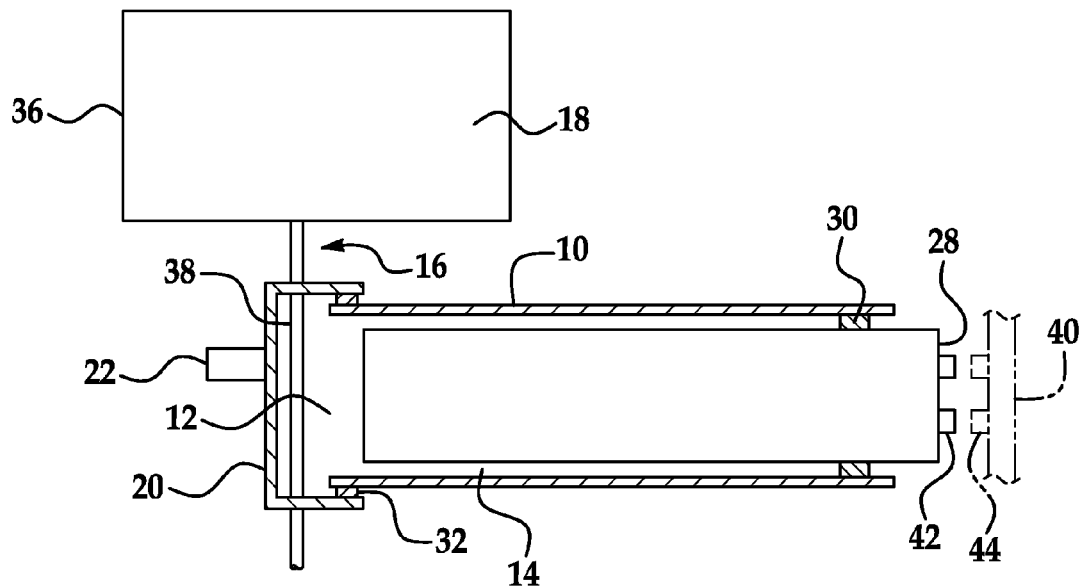
FIG. 1 is a cross-sectional view of one enclosure.

Referring now to FIG. 1, a cross-sectional view shows an elongate enclosure 10. The elongate enclosure 10 can have an opening 12 at one end defining an interior volume 14. The elongate enclosure 10 can house a cell 28 of a lithium-ion battery. The elongate enclosure 10 can leave the positive and negative terminals 42 of the cell 28 exposed. The exposed positive and negative terminals 42 can be connected to a battery grid board 40 with one or more connectors 44. The positive and negative terminals 42 can plug into the corresponding connectors 44 as the battery cell slides within the corresponding elongate enclosure 10 into place. A container 36 can enclose a supply of a fluid agent 18. The container 36 can be in fluidic contact with the interior volume 14 of the elongate enclosure 10 via a fluid delivery system 16.

The elongate enclosure 10 can be constructed in such a way so as to be airtight. In the event of a cell fire, the elongate enclosure 10 can prevent the entry of oxygen from the air and can prevent the fire and elevated temperatures from spreading. Each cell 28 can be housed separately in one elongate enclosure 10 or housed together. The elongate enclosure 10 can be made out of any thermally insulating material, by way of example and not limitation, such as ground glass, graphite or ceramic. The material chosen depends on the environment in which the invention is being used. For instance, in applications where cost is a consideration, but the weight and total volume occupied by the invention are not, ground glass can be used. If lower weight, lower total volume occupied and ability to withstand increased temperatures are desired, then ceramic or graphite can be used. However, since the elongate enclosure 10 serves to thermally insulate the cell 28, any thermally insulating material can be used to fabricate the elongate enclosure 10.

The fluid delivery system 16 can be fastened to the container 36 and can run through the interior volume 14 of the elongate enclosure 10. Static or dynamic pressure can be used to move the fluid agent 18 from the container 36 into the fluid delivery system 16. The fluid delivery system 16 can allow the delivery of the fluid agent 18 from the container 36 to the interior volume 14 of the elongate enclosure 10 in the event of a thermal runaway or cell fire. The fluid delivery system 16 can incorporate a temperature and/or flame sensitive tube 38. In the event of a thermal runaway or cell fire, the elevated temperatures or open flame can cause the temperature and/or flame sensitive tube 38 to rupture, releasing the fluid agent 18 into the interior volume 14 of the elongate enclosure 10. The release of the fluid agent 18 allows the fluid agent 18 to come into thermal contact with the cell 28 resulting in cooling of the cell 28 and retarding of any fires existing in the elongate enclosure 10. This operation results in a passive system that does not require user intervention. However, it should be recognized by those skilled in the art that various levels of user intervention can be implemented, if so desired. The temperature and/or flame sensitive tube 38 can be made out of any material meant to rupture in response to exposure to a certain temperature and/or after exposure to open flame. A suitable material for the temperature and/or flame sensitive tube 38 should be resistant to rupture during the normal operating temperature of the cell 28. The material can also be chosen so the fluid agent 18 resists chemical reaction with the temperature and/or flame sensitive tube 38 to cause a premature rupture.

The fluid agent 18 can be any agent meant to suppress, retard or prevent fires, or any agent meant to absorb or dissipate heat. By way of example and not limitation, the agent can be a foam or an aqueous based solution. The aqueous based solution can be water plus the inclusion of a water soluble additive meant to increase fire retarding effectiveness or decrease the volume of water needed to effectively fire retard such as FEM-12SC, FireBane 1170, or Cold Fire 302. The agent sold under the commercial name FEM-12SC is manufactured by TLI Group Ltd. located in Carver, Mass. The agent sold under the commercial name FireBane 1170 is manufactured by GSL, Inc. located in Tulsa, Okla. The agent sold under the commercial name Cold Fire 302 is manufactured by Firefreeze Worldwide, Inc. located in Rockaway, N.J.

The elongate enclosure 10 can incorporate a cap 20 on the opening 12 end. The cap 20 can serve to close the opening 12. The cap 20 can be released from the elongate enclosure 10 for battery cell maintenance. In the event of a malfunctioning cell, by way of example and not limitation, exhibiting thermal runaway, the cap 20 can be disengaged from the elongate enclosure 10 in order to remove and properly handle the malfunctioning cell.

The cap 20 can incorporate a pressure relief system 22. In the event of a cell fire, a gas will build up inside the elongate enclosure 10 causing an increase in pressure. As pressure inside the elongate enclosure 10 rises, the risk of explosion increases. The pressure relief system 22 can enable release of pressure from the interior volume 14 of the elongate enclosure 10 to a volume outside of the elongate enclosure 10. The pressure for opening up the contact between the interior volume 14 of the elongate enclosure 10 to a volume outside the elongate enclosure 10 can be selected so the pressure can be relieved before becoming sufficiently high to cause an explosion.

A second seal member 32 can extend between the cap 20 and the wall of the elongate enclosure 10. The second seal member 32 can be made out of any material which allows the second seal member to form an airtight seal between the cap 20 and the wall of the elongate enclosure 10.

Figure 2:
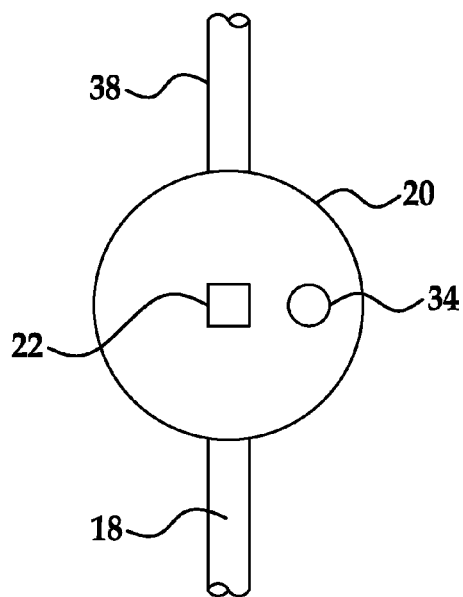
FIG. 2 is a top view of one enclosure.

Referring now to FIG. 2, a top view illustrates the cap 20 can incorporate a fluid release system 34. In the event of a cell fire, the fluid delivery system 16 delivers fluid agent to the interior volume 14 of the elongate enclosure 10. The fluid release system 34 can enable a controlled rate of leakage from the interior volume 14 of the elongate enclosure 10 to the volume outside of the elongate enclosure after the interior volume 14 has been filled with liquid. The controlled rate of leakage can assist in temperature and/or heat dissipation as well as pressure relief. It should be recognized that the controlled rate of leakage determines a time period of delivery of the fluid agent 18 to any battery cell 28 within an elongate enclosure 10 experiencing an abnormal thermal event, and that the time period can be affected by the volume of agent storage, the controlled rate of leakage, and the number of battery cells experiencing abnormal thermal events simultaneously or consecutively.

Figure 3:
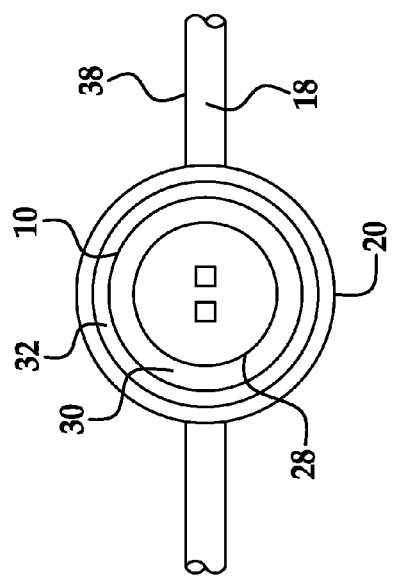
FIG. 3 is a bottom view of one enclosure.

Referring now to FIG. 3, a bottom view shows that a first seal member 30 can extend between the cell 28 and the wall of the elongate enclosure 10 adjacent an end opposite from the cap 20. The first seal member 30 can be made out of any material which allows the first seal member 30 to form an airtight seal between the cell 28 and the wall of the elongate enclosure 10.

Figure 4:
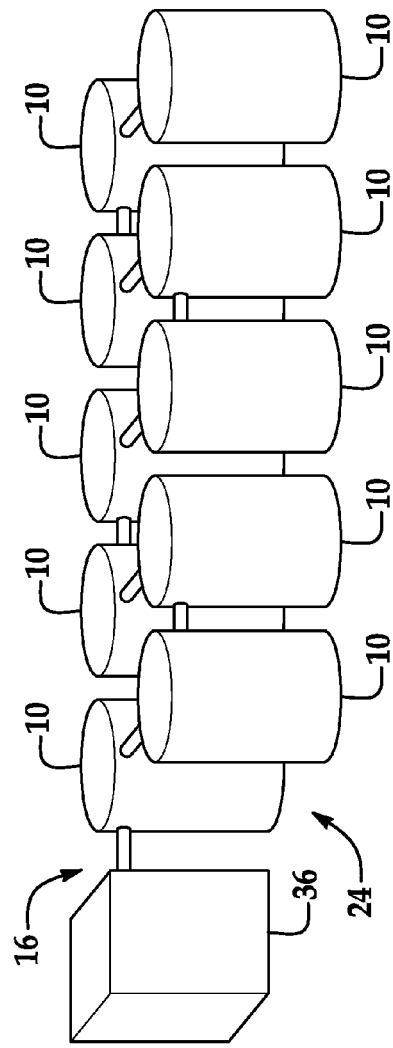
FIG. 4 is a simplified isometric view of a plurality of enclosures mounted vertically.

Referring now to FIG. 4, a simplified isometric view shows a plurality of elongate enclosures 10 mounted with corresponding axes extending vertically and parallel to one another 24. The fluid delivery system 16 can be fastened to the container 36 and can contain the fluid agent. The fluid agent can run through each of the elongate enclosures 10 in a serpentine and/or straight line fashion, terminating at the last elongate enclosure. The container 36 can provide fluid communication with one or more interior volumes of the elongate enclosures in response to the rupture of the fluid delivery system 16 within one or more elongate enclosures.

Figure 5:
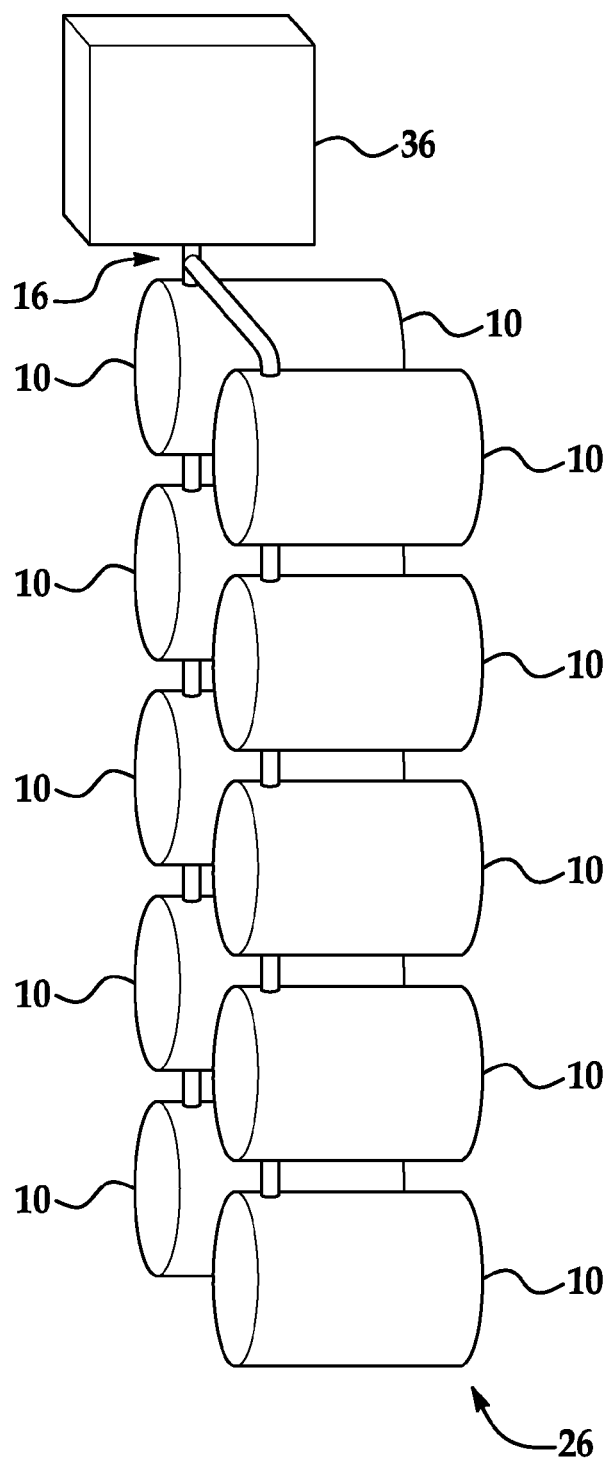
FIG. 5 is a simplified isometric view of a plurality of enclosures mounted horizontally.

Referring now to FIG. 5, a simplified isometric view shows a plurality of elongate enclosures 10 mounted with corresponding axes extending horizontally and parallel to one another 26. The fluid delivery system 16 can be fastened to the container 36 and can contain the fluid agent. The fluid agent can run through each of the elongate enclosures 10 in a serpentine and/or straight line fashion, terminating at the last elongate enclosure. The container 36 can provide fluid communication with one or more interior volumes of the elongate enclosures in response to the rupture of the fluid delivery system 16.

Referring now to FIG. 1, in operation the fire suppression system moves fire retarding or heat dissipating fluid agent 18 from the container 36 into the temperature and/or flame sensitive tube 38 by gravity or pressure generating equipment such as, by way of example and not limitation, pumps or pressurized gas, such as nitrogen. When a cell 28 undergoes thermal runaway, heat is generated and eventually fire will erupt. In response to either the temperature reaching a certain threshold or open flames reaching the temperature and/or flame sensitive tube 38, the temperature and/or flame sensitive tube 38 will rupture, causing the release of the fire-retarding or heat-dissipating fluid agent 18 onto the cell 28. The cell 28 and the fire-retarding or heat-dissipating fluid agent 18 can come into thermal contact resulting in cooling of the cell 28 and suppression of any fires existing in the elongate enclosure 10. The cap 20 on the elongate enclosure 10 can then be removed in order to properly remove and dispose of the malfunctioning cell.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A device for suppressing fires generated by self-contained removable lithium-ion batteries having outer casings with external surfaces supporting positive and negative terminals comprising:
   at least one elongate enclosure (10), each enclosure having an internal surface defining an interior volume (14) for housing by insertion therein at least one cell (28) of a self-contained removable lithium-ion battery having an outer casing with an external surface to define an open space between the external surface of the outer casing of the at least one cell and the internal surface of each enclosure; and
   at least one fluid delivery system (16) in fluid communication with each interior volume (14) defined by the at least one elongate enclosure (10), the at least one fluid delivery system (16) including a temperature sensitive tube, wherein a temperature induced rupture of the at least one fluid delivery system (16) passing through the at least one elongate enclosure (10) releases a suppression agent into the interior volume (14) of the elongate enclosure (10) and into the open space defined therein to be in fluid contact with the external surface of the outer casing of the at least one cell of the self-contained removable lithium-ion battery inserted within the at least one enclosure.

2. The device of claim 1, wherein the at least one elongate enclosure (10) includes an opening (12) and further comprises:
   a cap (20) releasably engageable with the one end of the at least one elongate enclosure (10) to close the opening.

3. The device of claim 1 further comprising:
   a pressure relief system (22) in fluid communication with the interior volume (14) of the elongate enclosure (10).

4. The device of claim 1 further comprising:
   a fluid release system (34) in fluid communication with the interior volume (14) of the elongate enclosure (10).

5. The device of claim 1, wherein the at least one elongate enclosure (10) further comprises:
   an array defined by a plurality of elongate enclosures (10) mounted with corresponding axes extending vertically (24) and parallel to one another.

6. The device of claim 1, wherein the at least one elongate enclosure (10) further comprises:
   an array defined by a plurality of elongate enclosures (10) mounted with corresponding axes extending horizontally (26) and parallel to one another.

7. The device of claim 1 further comprising:
   a fluid agent (18) carried within the fluid delivery system (16) for delivery to each interior volume (14) in response to a temperature induced rupture of the fluid delivery system (16) passing through the at least one enclosure (10); and
   wherein the fluid agent (18) further comprises a heat dissipating agent (18) delivered by the at least one temperature sensitive tube (38).

8. The device of claim 1 further comprising:
   a fluid agent (18) carried within the fluid delivery system (16) for delivery to each interior volume (14) in response to a temperature induced rupture of the fluid delivery system (16) passing through the at least one enclosure (10); and
   at least one temperature sensitive tube (38) passing through the at least one enclosure (10), wherein the fluid agent (18) is delivered in response to a temperature induced rupture of the at least one temperature sensitive tube (38) passing through the at least one enclosure (10).

9. The device of claim 8, wherein the at least one temperature sensitive tube (38) is sensitive to open flame (16).

10. A device for suppressing fires generated by self-contained removable lithium-ion batteries having outer casings with external surfaces supporting positive and negative terminals comprising:
    at least one elongate enclosure (10), each enclosure with an opening (12) at one end and an internal surface defining an interior volume (14) for housing by insertion therein at least one cell (28) of a self-contained removable lithium-ion battery having an outer casing with an external surface to define an open space between the external surface of the outer casing of the at least one cell and the internal surface of each enclosure;
    a cap (20) releasably engageable with the one end of the at least one elongate enclosure (10) to close the opening (12); and
    at least one temperature and flame sensitive tube (38) passing through the at least one enclosure (10) and located external with respect to the outer casing of the self-contained removable lithium-ion battery, the at least one temperature and flame sensitive tube (38) for fluid communication into the open space defined between the external surface of the outer casing of the at least one cell and the internal surface of the at least one enclosure in response to temperature induced rupture.

11. The device of claim 10 further comprising:
    a pressure relief system incorporated into the cap (20); and
    a fluid release system (34) incorporated into the cap (20).

12. The device of claim 10, wherein the at least one elongate enclosure (10) further comprises:
    an array defined by a plurality of elongate enclosures (10) mounted with corresponding axes extending vertically (24) and parallel to one another.

13. The device of claim 10, wherein the at least one elongate enclosure further comprises:
    an array defined by a plurality of elongate enclosures (10) mounted with corresponding axes extending horizontally (26) and parallel to one another.

14. The device of claim 10 further comprising:
    a fluid agent (18) carried within the at least one temperature sensitive tube (38) for delivery to the interior volume (14) of the at least one enclosure (10) in response to a temperature induced rupture of the at least one temperature sensitive tube (38) passing through the at least one enclosure (10); and
    wherein the fluid agent (18) further comprises a heat dissipating agent (18) delivered by the at least one temperature sensitive tube (38).

15. A device for suppressing fires generated by lithium-ion batteries comprising:

an array defined by a plurality of elongate enclosures (10), each enclosure with an opening (12) at one end defining an interior volume (14) for housing at least one cell (28) of a lithium-ion battery;

a plurality of caps (20), each cap releasably engageable with one end of a corresponding elongate enclosure (10) to close the opening (12);

a fluid delivery system (16) in fluid communication with each interior volume (14) defined by a corresponding one of the plurality of elongate enclosures (10), the fluid delivery system (16) including at least one heat sensitive tube (38) passing through each of the plurality of caps (20) in serpentine fashion to be in fluid communication with each interior volume of the plurality of elongate enclosures (10); and a fluid agent (18) carried within the at least one temperature sensitive tube (38) for delivery to the interior volume of at least one of the plurality of enclosures (10) defining by the array, the fluid agent (18) delivered in response to a temperature induced rupture of the at least one temperature sensitive tube (38) passing through the interior volume (14) of the plurality of elongate enclosures (10) during a thermal runaway chemical reaction event occurring within a cell (28) of a lithium-ion battery housed within the corresponding one of the plurality of elongate enclosures (10) defining the array.

16. The device of claim 15 further comprising:

a pressure relief system (22) incorporated into each of the plurality of caps (20).

17. The device of claim 15 further comprising:

a fluid release system (34) incorporated into the cap (20).

18. The device of claim 15, wherein the at least one temperature sensitive tube is sensitive to open flame (38).

19. The device of claim 15 further comprising:

a first seal member (30) extending between the cell (28) of the lithium-ion battery and a wall of the corresponding enclosure (10) adjacent an end opposite from the cap (20).

20. The device of claim 15 further comprising:

a second seal member (32) associated with a corresponding one of each of the plurality of caps (20) for sealing the opening in the one end of the corresponding enclosure (10) while engaging the cap (20) thereon.

* * * * *